M. G. BLINN.
MILK-PAIL.
No. 178,100. Patented May 30, 1876.
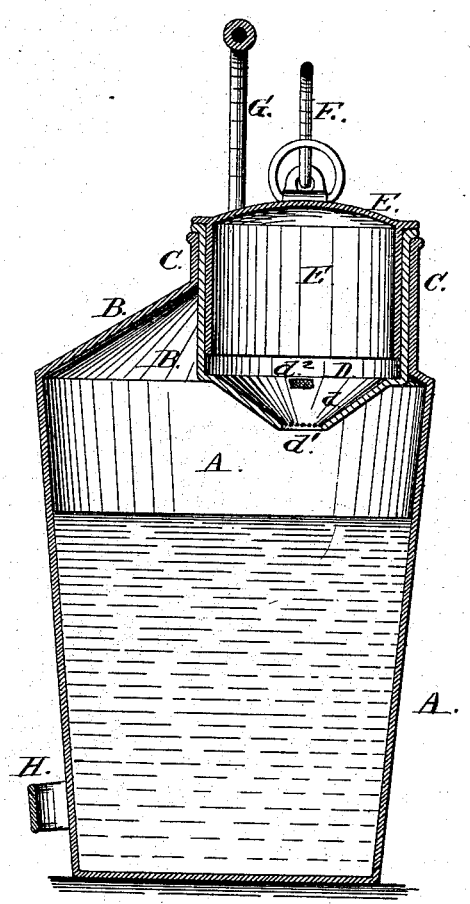
ATTEST:
Robert Burns.
Le Blond. Burdett.
INVENTOR:
Malcolm G. Blinn
By Knight Bro
Attys

UNITED STATES PATENT OFFICE.

MALCOLM G. BLINN, OF ST. LOUIS, MISSOURI.

IMPROVEMENT IN MILK-PAILS.

Specification forming part of Letters Patent No. 178,100, dated May 30, 1876; application filed March 10, 1876.

*To all whom it may concern:*

Be it known that I, MALCOLM G. BLINN, of the city and county of St. Louis, and State of Missouri, have invented a certain new and useful Improvement in Milking-Pails, of which the following is a full, clear, and exact description, reference being had to the accompanying drawing, making part of this specification.

My invention relates to those milking-pails whose top is provided with a neck for the reception of a strainer.

My improvement consists in a milking-pail having a fixed top, in one side of which is a vertical neck that forms a spout, out of which the milk is poured. Into the neck is fitted a strainer, having one or more gauze-covered apertures.

The drawing is a vertical section of the pail, axial to it and to the strainer.

A is the lower portion of the pail, which may be made of any suitable form and dimensions, and B is the fixed top. The top has, upon one side thereof, a vertical neck or spout, C. This spout is preferably cylindrical in form, and is so constructed as to receive a removable strainer, D. The strainer rests, as shown, in the neck while milking, and receives the streams of milk, and is drawn out of the neck preparatory to pouring the contents of the pail out through the neck C. The arrangement is such that the milk may be poured directly from the pail into a milk-can or small crock, the neck C confining the stream to narrow dimensions.

I prefer to make the strainer with a conical bottom, $d$, and a gauze-covered aperture, $d^1$, at the bottom, and, in order to insure a certain amount of milk remaining in the strainer while milking—so as to prevent splashing—I provide one or more gauze-covered openings, $d^2$, at a higher elevation, so as to form an overflow, to prevent the milk attaining a higher level than said holes $d^2$. E is the strainer-cover, and F the bail of the strainer. G is the bail of the pail. H is a handle near the bottom of the pail, at the side opposite to the neck, and which is used to tilt the pail in pouring out the contents. The strainer fits tightly into the neck, so that in case the pail is kicked or otherwise turned over the milk will not spill.

I claim—

The pail having a fixed top, B, with a spout or neck, C, upon one side thereof, constructed to receive a strainer, D, substantially as set forth.

MALCOLM G. BLINN.

Witnesses:
SAML. KNIGHT,
ROBERT BURNS.